US010077098B2

(12) United States Patent
Cappiello et al.

(10) Patent No.: US 10,077,098 B2
(45) Date of Patent: Sep. 18, 2018

(54) CONTROL METHOD FOR ANTI-ROLL STABILIZATION OF WATERCRAFT, AND CORRESPONDING STABILIZATION SYSTEM AND COMPUTER PROGRAM PRODUCT

(71) Applicant: CMC MARINE S.r.l., Como (IT)

(72) Inventors: Alessandro Cappiello, Pare (IT); Carlo Terruzzi, Como (IT); Francesco Pagano, Cascina (IT)

(73) Assignee: CMC MARINE S.R.L., Como (IT)

( * ) Notice: Subject to any disclaimer, the term of this patent is extended or adjusted under 35 U.S.C. 154(b) by 160 days.

(21) Appl. No.: 13/900,322

(22) Filed: May 22, 2013

(65) Prior Publication Data

US 2013/0319312 A1 Dec. 5, 2013

(30) Foreign Application Priority Data

May 31, 2012 (IT) .............................. TO2012A0472

(51) Int. Cl.
*B63B 39/06* (2006.01)
*G05D 1/08* (2006.01)

(52) U.S. Cl.
CPC ........... *B63B 39/06* (2013.01); *G05D 1/0875* (2013.01)

(58) Field of Classification Search
CPC ....... G05D 1/0875; G05D 1/0206; B63J 2/06; B63B 39/06; B63B 39/062; B63B 39/061; B63B 39/08
USPC .................... 114/121, 122, 124, 126; 701/21
See application file for complete search history.

(56) References Cited

U.S. PATENT DOCUMENTS

| | | | | |
|---|---|---|---|---|
| 3,665,168 A | * | 5/1972 | Canfield | ................. 701/21 |
| 3,738,304 A | * | 6/1973 | Duberley | ............... 114/126 |
| 5,152,239 A | * | 10/1992 | Hossfield et al. | ........ 114/144 E |
| 5,488,919 A | * | 2/1996 | Ferreiro | ............... B63H 25/06 |
| | | | | 114/122 |
| 6,367,400 B1 | | 4/2002 | Niggemann et al. | |
| 2010/0025996 A1 | * | 2/2010 | Edwards et al. | ................ 290/44 |

FOREIGN PATENT DOCUMENTS

| | | |
|---|---|---|
| EP | 0 754 618 A1 | 1/1997 |
| EP | 1577210 B1 | 2/2008 |
| EP | 2172394 B1 | 4/2012 |
| GB | 940217 | 10/1963 |
| GB | 999306 A | 7/1965 |

(Continued)

OTHER PUBLICATIONS

Tristan Perez; Ship Motion Control; Course Keeping and Roll Stabilisation Using Rudder and Fins dated 2005; 63 total pages.

(Continued)

*Primary Examiner* — Andrew Polay
(74) *Attorney, Agent, or Firm* — Patterson & Sheridan, LLP

(57) ABSTRACT

A method for controlling a stabilizing fin for anti-roll stabilization of watercraft standing at anchor, comprising the steps of: detecting at least one value identifying roll of the watercraft; estimating the expected oscillation of roll of the watercraft as a function of the value detected; determining a path for the movement of the stabilizing fin as a function of the expected roll; and controlling the movement of the stabilizing fin as a function of the path.

17 Claims, 7 Drawing Sheets

(56) References Cited

FOREIGN PATENT DOCUMENTS

GB            1201401 A      8/1970

OTHER PUBLICATIONS

Hongzhang, et al.; Application of Generalized Predictive Control Algorithm on Fin; Proceedings of IWSDA dated 2007; 5 total pages.
Third Party Observations for Application No. 13166642.2 dated Aug. 15, 2014; 6 total pages.
European Patent Office; Communication Pursuant to Rule 114(2) EPC for Application No. 13166642.2 dated Aug. 27, 2014; 1 page.
Tristan Perez; Ship Motion Control; Chapter 13—Constrained Control of Fin Stabilisers, 2005; pp. 251-263.

\* cited by examiner

CONTROL METHOD FOR ANTI-ROLL STABILIZATION OF WATERCRAFT, AND CORRESPONDING STABILIZATION SYSTEM AND COMPUTER PROGRAM PRODUCT

CROSS-REFERENCE TO RELATED APPLICATIONS

This application claims benefit of Italian Patent Application Number TO2012A000472, filed May 31, 2012, which is herein incorporated by reference.

BACKGROUND OF THE INVENTION

Field of the Invention

The present invention relates to techniques for anti-roll stabilization of watercraft.

The present invention has been developed in particular for stabilization of watercraft standing at anchor.

Description of the Related Art

One of the major causes of malaise on board a watercraft, both during navigation and at anchor, is the roll to which the watercraft is subjected on account of wave motion.

For this reason, stabilization systems are frequently used that comprise one or more stabilizing fins. The purpose of stabilizing fins is to increase the comfort on board by reducing considerably any motion of roll in every condition of use of the watercraft, both during navigation and at anchor.

For instance, through rotation of one or more pairs of fins, which are symmetrical with respect to the longitudinal axis, it is possible to create a moment on the watercraft that can be exploited for countering the moment generated by the wave motion and for reducing considerably roll.

In particular, during navigation the stabilizing fins exploit the phenomenon of lift for generating high stabilizing moments with a relatively exiguous surface of actuation. For instance, the documents Nos. GB 999 306, EP 0 754 618, GB 1 201 401 describe systems for anti-roll stabilization of watercraft during navigation.

Instead, at anchor it is not possible to exploit the lift but it is necessary to exploit the inertial forces (acceleration and deceleration) and the forces of viscous resistance (linked to the velocity of actuation of the fin) for generating the stabilizing moment. It may easily be understood that for stabilization at anchor a surface of actuation is necessary that is considerably greater than the one sufficient during navigation and that the aspect ratio of the fin has a major influence on efficiency. For instance, the document No. EP 1 577 210 describes such a system for anti-roll stabilization of watercraft standing at anchor in which the aspect ratio of the fin is modifiable.

FIG. 1 illustrates in this context a generic control scheme, in which a control system 10 controls operation of a system 20. In particular, the control system 10 comprises a control module 102 configured for generating a control signal u necessary for minimizing and/or annulling an error e. For instance, the error e can be determined in a block 100 as the difference between a reference signal r and a measurement signal y that indicates the state of the system 20.

In particular, in the case of the stabilizing fins, the system 20 comprises both the watercraft 202 and the system for actuation of the fins 200. Consequently, the control system 10 has the purpose of countering roll; i.e., the reference signal r is typically zero, the measurement signal y corresponds to a signal that indicates the roll of the watercraft $\vartheta$, and the control signal u is the signal that drives the actuator of the fin.

Finally, the document No. EP 2 172 394 describes a system for anti-roll stabilization of watercraft in which an electric motor is used as actuator for the stabilizing fin. In particular, the control system controls movement of the fin as a function of the roll of the watercraft and of the angular position of the stabilizing fin; i.e., the state signal y also comprises a signal that indicates the angular position of the stabilizing fin.

SUMMARY OF THE INVENTION

The object of the present invention is to provide solutions that improve the results of systems for anti-roll stabilization of watercraft.

In fact, thanks to the continuous analysis of the data acquired during the numerous applications, the inventors have been able to formulate a control approach that is totally new and innovative with respect to the solutions adopted previously.

In particular, the inventors have been able to establish a path of movement of the fins that enables optimization of the result of anti-roll stabilization.

With a view to achieving the aforesaid object, the subject of the invention is a control method for anti-roll stabilization of watercraft that presents the characteristics specified in the annexed Claim 1. The invention also relates to the corresponding stabilization system, as well as a computer program product that can be loaded into the memory of at least one computer and comprises portions of software code that are able to implement the steps of the method when the product is run on at least one computer. As used herein, reference to such a computer program product is understood as being equivalent to reference to a computer-readable means containing instructions for control of the processing system for co-ordinating implementation of the method according to the invention. Reference to "at least one computer" is evidently to be understood as highlighting the possibility for the present invention to be implemented in modular and/or distributed form.

The claims form an integral part of the teaching provided herein in relation to the invention.

As mentioned previously, the present description provides solutions for anti-roll stabilization of watercraft. For instance, in various embodiments, the movement of a stabilizing fin is controlled for anti-roll stabilization of watercraft standing at anchor.

In various embodiments, at least one value identifying roll of the watercraft is detected, and the expected oscillation of roll of the watercraft is estimated as a function of the value detected. For instance, in various embodiments, the oscillation of roll of the watercraft is approximated via a sinusoidal wave.

Thanks to the above prediction of roll, the solutions described herein are able to determine a path for the movement of the stabilizing fin. For instance, in various embodiments, to determine the path for the movement of the stabilizing fin, the destabilizing moment of the sea and the stabilizing moment of the fin are estimated. For instance, the destabilizing moment of the sea can be estimated via a probabilistic approach, and the stabilizing moment of the fin can be determined as a function of the torque absorbed by the fin.

In various embodiments, in order to determine the path for movement of the stabilizing fin, a plurality of possible reference paths is selected, and a respective cost function is calculated for each reference path.

BRIEF DESCRIPTION OF THE DRAWINGS

The present invention will now be described in detail with reference to the attached drawings, which are provided purely by way of non-limiting example and in which.

DETAILED DESCRIPTION

In the ensuing description various specific details are illustrated aimed at providing an in-depth understanding of the embodiments. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of this description is intended to indicate that a particular configuration, structure, or characteristic described in relation to the embodiment is comprised in at least one embodiment. Hence, phrases such as "in an embodiment" or "in one embodiment" that may be present in different points of the present description do not necessarily refer to one and the same embodiment. Moreover, particular conformations, structures, or characteristics can be adequately combined in one or more embodiments.

The references used herein are provided merely for convenience and hence do not define the sphere of protection or the scope of the embodiments.

Figure 1:
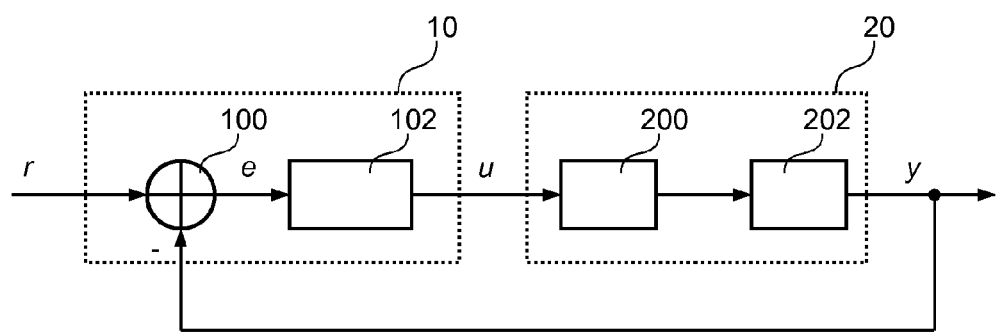
FIG. 1 illustrates a generic control scheme.

As mentioned previously, the physical phenomena that develop during stabilization at anchor and during stabilization during navigation are substantially different, and hence the mathematical model that describes the behaviour of the watercraft plus the actuation system, i.e., block 20 of FIG. 1, substantially differs in the two cases. Consequently, the stabilization mechanism should not be the same during navigation and at anchor.

Figure 2:
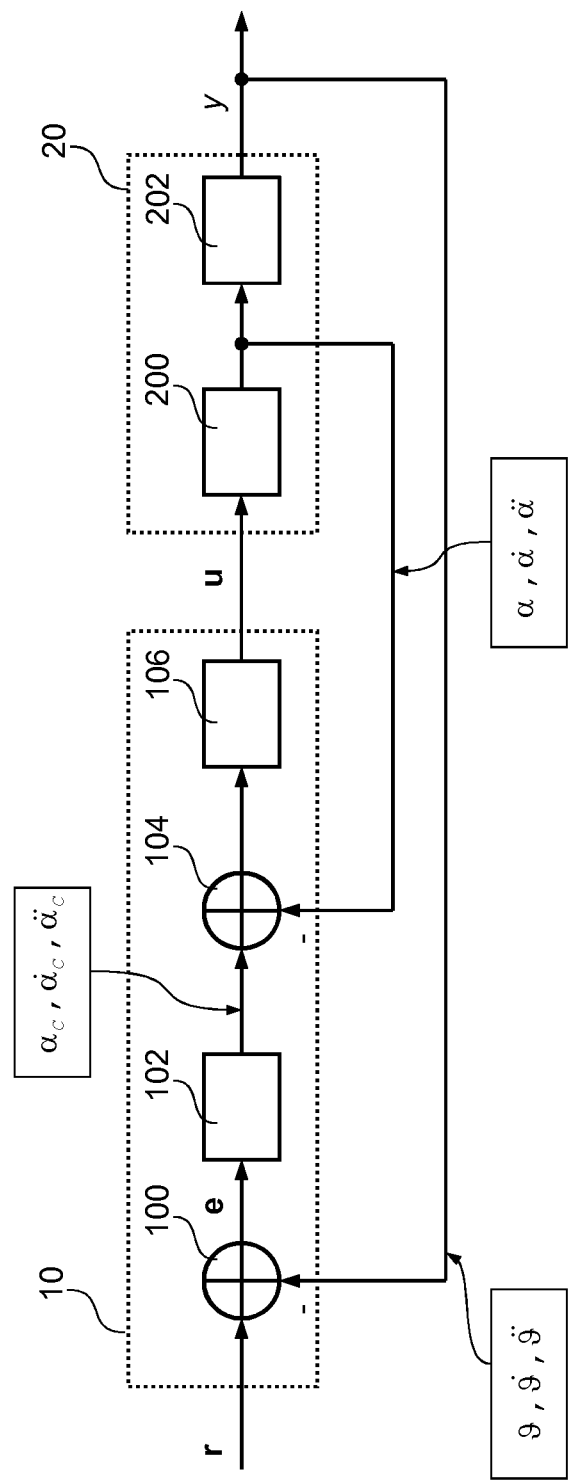

FIG. 2 shows a possible embodiment of a control system 10 for anti-roll stabilization of watercraft.

In one embodiment, said system is used as anti-roll stabilization system for watercraft during navigation.

In the embodiment considered, the control system 10 is based upon a complete state feedback and minimizes not only the roll but also the velocity, and the acceleration of roll enabling an improved comfort to be obtained. Said roll data can be detected through appropriate detection means, such as, for example, acceleration sensors, gyroscopes and/or inclinometers.

In particular, in one embodiment, the control system 10 receives at input a measurement vector that comprises the position of roll, such as for example the angle of roll $\vartheta$, the velocity of roll $\dot{\vartheta}$, and the acceleration of roll $\ddot{\vartheta}$, and a reference signal $r=[0, 0, 0]^T$. In a block 100 the control system calculates the error e as difference between the reference signal r and the measurement vector (or vice versa); namely, $$e = \begin{bmatrix} \vartheta \\ \dot{\vartheta} \\ \ddot{\vartheta} \end{bmatrix} \quad (1)$$

Consequently, the control system 10 is configured for minimizing and preferably annulling the position of roll $\vartheta$, the velocity of roll $\dot{\vartheta}$, and the acceleration of roll $\ddot{\vartheta}$.

In one embodiment, the control system 10 comprises two control submodules 102 and 106. The first control module 102 is configured for generating reference signals for the position $\alpha_C$, velocity $\dot{\alpha}_C$, and acceleration $\ddot{\alpha}_C$ of the stabilizing fin. Instead, the second control module 106 is configured for controlling movement of the fin and for minimizing the error between the movement made by the fin and the reference generated by the module 102; namely, the module 106 receives at input the difference between the position $\alpha_C$, velocity $\dot{\alpha}_C$, and acceleration $\ddot{\alpha}_C$ required, and the position $\alpha$, velocity $\dot{\alpha}$, and acceleration $\ddot{\alpha}$ of the fin. For instance, said difference can be calculated in a block 104.

For example, in one embodiment an electric motor is used for driving the stabilizing fin. In this case, the data on the behaviour of the stabilizing fin can be detected, for example, through an encoder coupled to the shaft of the electric motor that drives the stabilizing fin or directly to the shaft of the fin.

For instance, the block 102 can be obtained via PID (Proportional-Integral-Derivative) controllers, direct synthesis via "Pole Placement" or root locus. For instance, in one embodiment the control is designed using the root locus with pre-filter on the input and a feed-forward action; in this case, the control is based upon a linear combination of the state of the watercraft.

Consequently, feedback of the measurement of the movement of the fin to the module 106 represents an internal feedback or inner loop, and feedback of the measurement of roll to the module 102 represents an external feedback or outer loop. Consequently, the time for updating the output of the module 106 is preferably longer than the time for updating the output of the module 102.

The inventors have noted that the uncertainties are principally due to the destabilizing moment generated by the sea and by the speed of navigation. Even though the control system illustrated in FIG. 2 is particularly robust in regard to unknown disturbance and with parametric variations, there may be particular conditions in which the variations are such as not to enable optimal stabilization. For instance, for watercraft that can vary their own speed within a wide range, the system might not be able to guarantee satisfactory performance for all the speeds or could be insufficiently reactive or excessively reactive and hence not guarantee optimal comfort in all conditions of use. Moreover, non-optimal performance could arise also for particular marine weather conditions (such as stern waves). It should moreover be recalled that the motions of the watercraft are not uncoupled, and roll can be induced also by the motions of pitch and yaw.

Consequently, the control strategy illustrated in FIG. 2 does not always provide satisfactory performance.

In one embodiment, to prevent the above problems, mechanisms are used that enable "adaptation" of the control system.

Figure 3:
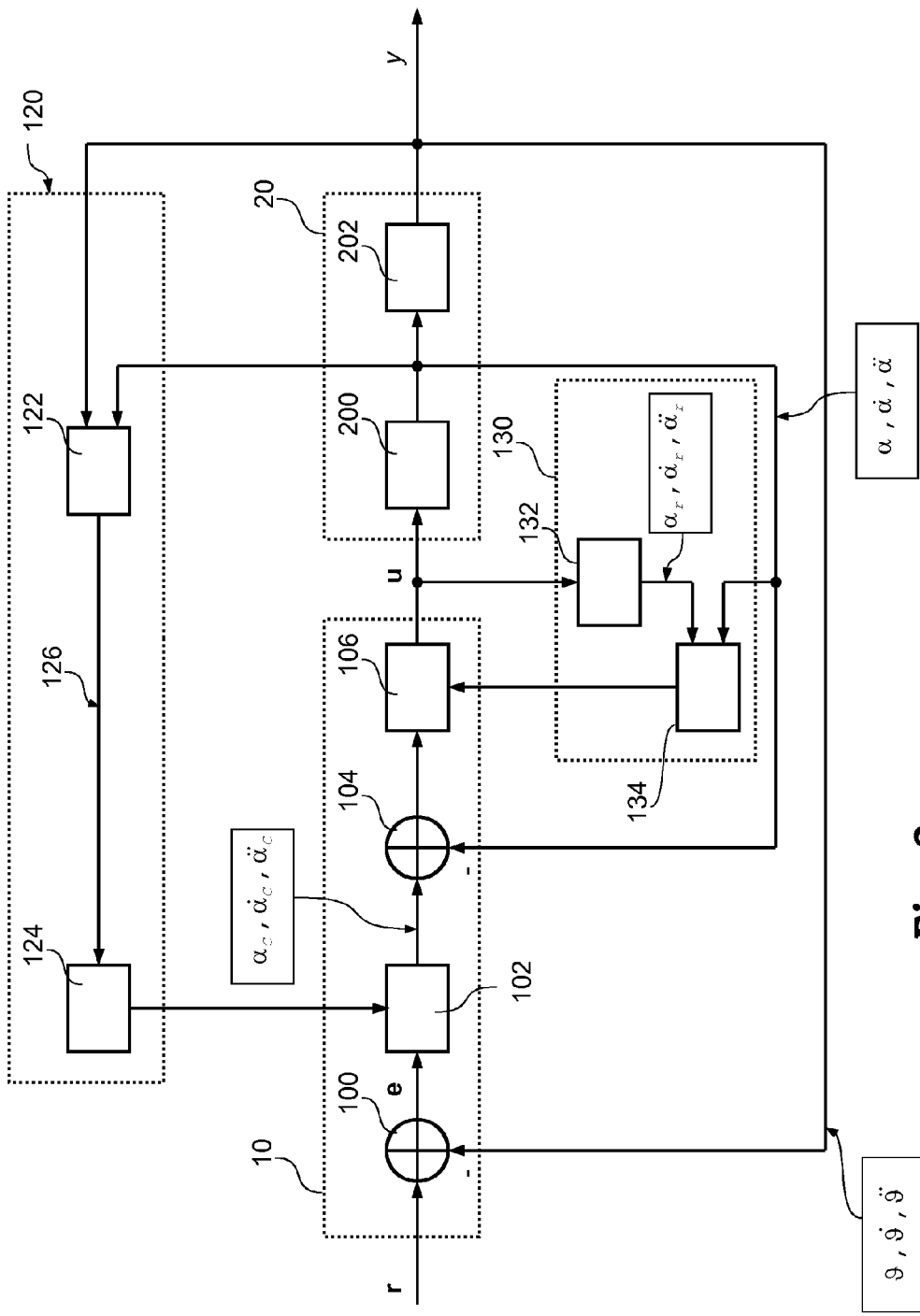

For instance, FIG. 3 shows an embodiment of a control system for anti-roll stabilization during navigation, in which a block 120 is used that adapts the control parameters of the control module 102 as a function of the conditions of the sea and/or of the stabilizing fin.

In particular, in one embodiment, the module 120 evaluates in real time the changed conditions of sea, speed, and other parameters of the watercraft (such as, for example, the load thereof).

For instance, in the embodiment considered, the module 120 comprises an identification module 122 and an adaptation module 124. The identification module 122 receives at input data that indicate the movement of the stabilizing fin and of the watercraft, such as for example the position $\alpha$, the velocity $\dot\alpha$, and the acceleration $\ddot\alpha$ of the fin, and the position of roll $\vartheta$, the velocity of roll $\dot\vartheta$, and the acceleration of roll $\ddot\vartheta$. On the basis of these data, the identification module 122 evaluates the optimal model and the uncertainties, and supplies an estimate of updated control parameters 126 to the adaptive block 124, which modifies the control parameters of the block 102.

In this way, the control module 102 is able to provide the best performance in any condition without having necessarily to read the cruising speed from the on-board systems, for example, through the autopilot, or other sensors, such as for example a GPS (Global Positioning System) receiver.

Instead, the control system of the actuator 106 is preferably designed on the basis of a model of the actuation system and enables a gentle and precise movement of the actuator. However, with the passage of time the actuator is inevitably subjected to wear, and consequently the controller of the block 106 might no longer provide optimal performance.

In one embodiment, to prevent these problems, a second module 130 is used responsible for adaptation of the control block 106.

In the embodiment considered, the module 130 comprises a reference module 132 and an adaptation module 134. The reference module 132 computes in real time a mathematical model of the actuator 200 and supplies at output estimates on the position $\alpha_r$, velocity $\dot\alpha_r$, and acceleration $\ddot\alpha_r$, of the fin. Instead, the adaptation module 134 establishes the optimal parameters for the control module 106 on the basis of the difference between the estimated position $\alpha_r$, velocity $\dot\alpha_r$, and acceleration $\ddot\alpha_r$, and the position $\alpha$, velocity $\dot\alpha$, and acceleration $\ddot\alpha$ of the fin.

Consequently, thanks to an accurate modelling of the real actuator 200, it is possible to obtain a practically zero tracking error, without, however, rendering the movement jerky. In practice, the adaptation module 130 enables the module 106 to exploit as much as possible the power available to the actuator in a gentle and controlled way.

The inventors have noted that the stabilization systems illustrated previously, albeit availing themselves of advanced adaptive systems are not always able to provide adequate performance if used for stabilization at anchor. In fact, the physical nature of the two phenomena differs too much for a single adaptive system to be able to yield optimal results in every situation.

The continuous analysis of the data acquired during the numerous applications has enabled the inventors to create a control system that is totally new and innovative as compared to the solutions used previously. In particular, the inventors have been able to establish the path of movement of the fins that enables an optimal efficiency at anchor to be obtained.

In various embodiments, this path is calculated constantly and implemented in the most appropriate moments, modified or interrupted if the predictions of roll do not prove real.

In various embodiments, the above control system is based upon a prediction of the movement of roll of the watercraft. Consequently, this system abandons the classic control model: it is not a state feedback, as in the case of navigation, since the behaviour of the fin (position, velocity, and acceleration) is no longer a linear combination of the angle of roll, velocity of roll, and acceleration of roll.

In various embodiments, the control system determines the path of the fin instant by instant (in terms of angular position, velocity, and acceleration) so as to develop a stabilizing torque that will enable total countering of the destabilizing torque of the sea. In the case where it is not possible to develop all the torque necessary, for example because the amount of roll is great, the control system chooses the path of the fin that will enable "abatement" of as much kinetic energy as possible so as to dampen roll.

In one embodiment, the anti-roll control system is generally based upon the control scheme illustrated in FIG. 1 or in FIG. 2.

Figure 4:
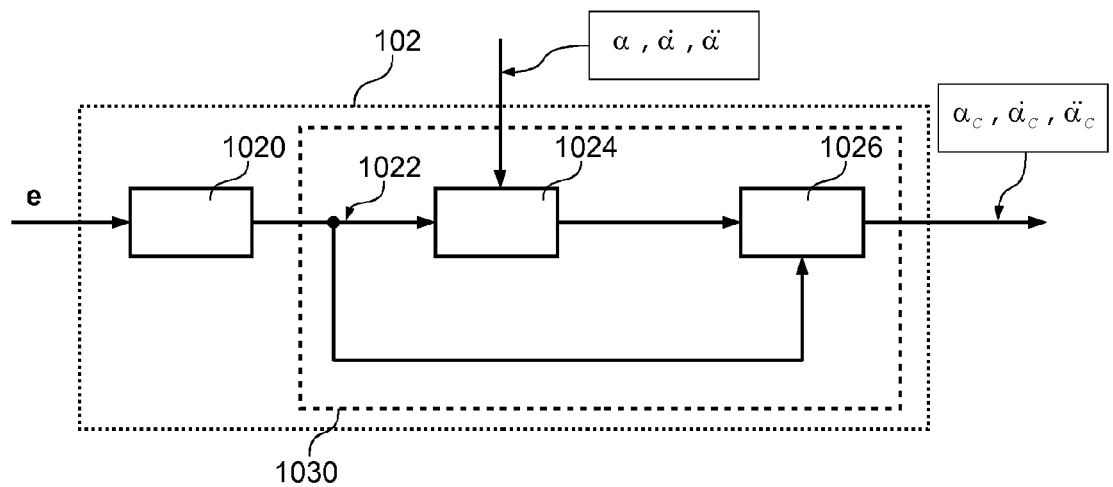
FIGS. 2 to 4 are block diagrams that show various aspects of stabilization systems according to the present description.

However, the controller 102 functions in a substantially different way. For instance, FIG. 4 shows a possible embodiment of a control module 102 for anti-roll stabilization of watercraft standing at anchor. In particular, also in this case, the control module is configured for generating the control parameters for the actuator 200, such as for example the position $\alpha_C$, velocity $\dot\alpha_C$, and acceleration $\ddot\alpha_C$.

In one embodiment, the control module 102 comprises two submodules:

a first module 1020 configured for estimating and predicting the movement of the watercraft; and a second module 1030 configured for determining the path for the movement of the stabilizing fin.

In particular, in various embodiments, the module 1030 comprises two blocks:

a first module 1024 configured for determining the stabilizing moment that the fin must develop; and a second module 1026 configured for determining the control parameters for the stabilizing fin.

In one embodiment, the module 1020 receives at input the data that identify roll of the watercraft, i.e., the rotation about the longitudinal axis x, such as for example the position (or angle) of roll $\vartheta$, the velocity of roll $\dot\vartheta$, and the acceleration of roll $\ddot\vartheta$ and yields at output data 1022 that identify the oscillation of roll.

For instance, in one embodiment, the oscillation of roll is approximated in time t as sinusoidal motion of amplitude A and period T; namely, $$\vartheta = A \cdot \sin\left(\frac{2\pi}{T}t\right) \quad (2)$$

Consequently, in the embodiment considered, the module 1020 yields at output the amplitude of oscillation A, the period of oscillation T (or alternatively the frequency of oscillation), and the phase:

$$\phi = \frac{2\pi}{T}t \quad (3)$$

For instance, in one embodiment, the module determines the instantaneous amplitude A and the instantaneous period of roll T on the basis of the dynamics between the velocity of roll and the angle of roll. In particular, the instantaneous amplitude A and the instantaneous period of roll T are estimated at certain instants in time and are an estimate of the oscillation of roll (see Eq. (2)) for the next period T or half-period T/2.

In general, the duration of the oscillation $T_e$ can be determined by detecting the time of a half-period or period of oscillation of the watercraft. For instance, in one embodiment, the module records the duration of the oscillation $T_e$ as time between two reversals of motion of roll, keeping it appropriately filtered and rejecting the measurements that do not fall within a reliable range.

In one embodiment, the module 1020 uses this measurement to be able to estimate the pulsation at which the watercraft is rolling as $$w_e = \frac{2\pi}{T_e} \qquad (4)$$

In one embodiment, the instantaneous amplitude is calculated as $$A = \sqrt{\vartheta^2 + \frac{\dot{\vartheta}^2}{w_e^2}} \qquad (5)$$

i.e., the instantaneous amplitude is determined as a function of the current position of roll $\vartheta$ and a contribution that takes into account the current velocity of roll $\dot{\vartheta}$.

In one embodiment, the following is calculated:

$$w = \frac{d}{dt}\left[\tan^{-1}\left(\frac{\vartheta \cdot w_e}{\dot{\vartheta}}\right)\right] \qquad (6)$$

where w is the best estimate of the instantaneous pulsation, while $w_e$ is the estimate of the pulsation updated at each period of oscillation and hence in a non-instantaneous way.

Consequently, in the embodiment considered, the instantaneous period of roll is $$T = \frac{2\pi}{w} \qquad (7)$$

In one embodiment, the module calculates also the time derivative of the instantaneous amplitude of roll $\dot{A}$ and the time derivative of the instantaneous period of roll $\dot{T}$.

For instance, in one embodiment, calculating the partial derivatives with respect to time of all the measurements and partial derivatives of A (instantaneous amplitude of roll) with respect to $\phi$ (phase of roll) and with respect to T (period of roll), the module 1020 linearly combines these values to obtain a filtered estimate of $\dot{A}$ and $\dot{T}$, where $\dot{\phi}$=w.

During the on-board tests conducted, this calculation method yielded the best estimate of the instantaneous time derivative of these measurements. Unlike the classic methods of approximation of the time derivative (finite differences, Runge-Kutta, etc.) the method proposed uses in combination the information deriving from the instantaneous phase, instantaneous pulsation, and instantaneous amplitude of roll. In this way, it is able not only to obtain a better estimate of the values in so far as the use of more information enables reduction of the uncertainties of measurement but also to obtain values that provide a probabilistic anticipation on the next seconds of variation of the motion of roll.

In one embodiment, the control module 102 receives not only data regarding roll but also other data on the behaviour of the watercraft.

For instance, in one embodiment, the module 102 receives at input data that also enable identification of:

the pitch, i.e., the rotation about the transverse axis y, such as for example the position or angle of pitch $\varphi$, the velocity of pitch $\dot{\varphi}$, and/or the acceleration of pitch $\ddot{\varphi}$; and the jolt, i.e., the movement of translation along the vertical axis z, such as for example the position of jolt $\gamma$, the velocity of jolt $\dot{\gamma}$, and/or the acceleration of jolt $\ddot{\gamma}$.

For instance, said data can be detected via triaxial gyroscopic sensors and triaxial accelerometers.

In one embodiment, the control module 1020 computes the coupling of the motions of roll, pitch, and jolt, to obtain at output roll data with a level of noise reduced with respect to just the roll data; namely, the module 1020 calculates a filtered position of roll $\vartheta_f$, a filtered velocity of roll $\dot{\vartheta}_f$, and a filtered acceleration of roll $\ddot{\vartheta}_f$. Said filtered data can also be used to estimate the oscillation of roll represented with reference to Eqs. (2) to (7).

In fact, the inventors have noted that in this way the signal of the acceleration of roll is very stable and accurate.

For instance, in one embodiment, said calculation of the filtered data is obtained using a Kalman filter. In particular, a Kalman filter is a filtering technique that derives from the optimal-control theory and via minimization processes (usually of the least-squares type) enables implementation of optimal filtering (according to a cost function). Kalman-filter theory is well known in the art, rendering any detailed description of such filters superfluous.

In one embodiment, the second module 1024 makes an assessment and a prediction—in probabilistic terms—of the destabilizing moment acting on the watercraft.

In particular, in one embodiment, the module 1024 uses the values of A, $\vartheta$, $\dot{A}$, $\dot{\phi}$ and $\dot{T}$ for determining:

the phase shift $\Gamma$ between the forcing of the destabilizing disturbance (sea waves) and the sinusoid of roll of the watercraft;

the duration expected for the next period of roll; and the amplitude expected for the next period of roll.

In one embodiment, the module calculates also the destabilizing moment expected for the next few instants.

For instance, in one embodiment the following equation of dynamic equilibrium is used:

$$M_d + M_s + M_r = \ddot{\vartheta} \cdot J_N \qquad (8)$$

where:

$M_d$ is the destabilizing moment of the sea;

$M_s$ is the stabilizing moment of the fins;

$M_r$ is the righting moment of the watercraft; and $J_N$ is the moment of inertia of the watercraft.

In particular, in one embodiment, the module 1024 receives at input the acceleration of roll $\ddot{\vartheta}$, for example the filtered acceleration of roll $\ddot{\vartheta}_f$ supplied by the module 1020, and calculates in real time the stabilizing moment of the fins $M_s$ and the righting moment of the watercraft $M_r$.

The righting moment of the watercraft $M_r$ represents the elastic return of the watercraft and depends upon the angle of roll and upon the parameters of the specific watercraft, in particular the transverse metacentric height (r-a) and the displacement $\Delta$. For instance, in one embodiment the righting moment of the watercraft $M_r$ is calculated as $$M_r = \Delta * (r-a) * \sin \vartheta$$

The person skilled in the art will appreciate that this relation is widely used in all fields of study of the dynamics of watercraft and is hence well known in the corresponding technical field.

Instead, the behaviour of the watercraft linked to $J_N$ is typically constant and can be determined thanks to measurements made during a step of calibration performed, for example, during the first seafaring voyages.

Consequently, the only remaining unknown is the destabilizing moment of the sea $M_d$. However, the inventors have noted that, if the destabilization of the sea and the phase shift and its time derivative are known, it is possible to calculate how the destabilization component will vary on average (once again in a probabilistic way) in the next few seconds, and define an expected profile of the destabilizing moment of the sea.

In general, each watercraft has characteristic data that enable processing of a mathematical model of the watercraft itself. For instance, typically of importance are the displacement and the transverse metacentric height. These data vary from one watercraft to another and are set, for example, within a memory. In this way, knowing $M_d$ (the only unknown of Eq. (8)) and calculating a finite difference of the profile determined (as described previously), it is possible to calculate the expected value of $M_d$ for the next few instants.

In one embodiment, the stabilizing moment of the fins $M_s$ is calculated as a function of the instantaneous stabilizing torque $C_s$ generated by the fins.

In particular, in one embodiment, the module 1024 determines said instantaneous stabilizing torque $C_s$ by weighting the results obtained with two different methods. However, in general, each of these methods could also be used individually.

In the embodiment considered, the first method relates the state of the fin $[\alpha\ \dot{\alpha}\ \ddot{\alpha}]$ to the useful lift produced L, and linearly combines these quantities as viscous forces, forces of inertia, and decomposes them according to the useful direction:

$$L=(c_v\cdot\dot{\alpha}+c_m\cdot\ddot{\alpha})\cdot\cos\alpha \tag{9}$$

The inventors have found that this estimate is particularly accurate in calm sea with rolls of limited amount.

In one embodiment, to obtain a relation that is true in real conditions, a component is introduced that depends upon the velocity of roll of the watercraft.

In particular, in the embodiment considered, this component is added to the viscous term (the blade moves in the water more or less fast as a result of the apparent current caused by the roll) and is scaled by the cosine of the position of the fin on account of the reduction of the surface exposed to the relative current due to the velocity of roll. Then the relation becomes $$L=(c_v\cdot(\dot{\alpha}+c_c\cdot\dot{\vartheta}\cdot\cos\alpha)+c_m\cdot\ddot{\alpha})\cdot\cos\alpha \tag{10}$$

where $c_v$ and $c_m$ depend upon the geometry of the fin and can be determined via fluid-dynamic simulations, possibly verified experimentally, and can be stored in the memory of the controller. Instead, the parameter $c_c$ depends upon the position in which the actuators are installed and upon the geometry of the blade. Also this parameter can be stored in the memory.

Instead, the second method evaluates the torque that the axis transmits to the fin and determines the lift useful for stabilization.

For instance, in the case of an electrical actuator, the module 1024 can derive the torque via a precise measurement on the engine shaft; by construction, the electromagnetic torque developed by a brushless motor depends, according to a constant of proportionality $K_m$ (which is constant and characteristic for each motor), upon the current that flows in the windings. By measuring the current supplied to the motor instant by instant it is hence possible to calculate the torque developed by the motor, where the following relation in general applies:

$$\alpha=i\alpha_m$$

namely, the acceleration of the fin α corresponds to the acceleration of the motor $\alpha_m$ (multiplied by the reduction ratio i).

Knowing the acceleration and the direct efficiency (constant acceleration and velocity) and indirect efficiency (deceleration) of the reducer, it is possible to compute the torque developed on the fin $$C_s=i\cdot\{C_m-\ddot{\alpha}_m(J_m+J_r)-(1-\eta)C_m\} \tag{11}$$

where:
i is reduction ratio between the movement of the electric motor and the fin;
$C_m$ is the motor torque;
$\ddot{\alpha}_m$ is the acceleration of the motor as detected via the encoder;
$J_m$ is the moment of inertia of the motor;
$J_r$ is the moment of inertia of the reducer; and
η is the efficiency,
where the moments of inertia, the efficiency, and the transmission ratios are typically known and certified by the manufacturers of the motors and of the reducers, and the instantaneous torque of the motor can be calculated on the basis of the currents of the motor.

Instead, in the case of a hydraulic actuator, it is possible to use, for example, a pressure transducer to know the pressure acting on the cylinders, and obtain the torque developed according to $$C_s=A_{eq}\cdot b\cdot\cos\alpha \tag{12}$$

where:
b is the arm of the hydraulic cylinder;
cos α is the contribution of the useful arm as the angle of the fin varies; and
$A_{eq}$ is the equivalent area of the cylinder.

In general, the measurement of the torque should be proportional to the lift developed in a direction orthogonal to the fin, which is to be considered only in the direction useful for stabilization. In actual fact, this measurement is less clear than the calculation according to the first method, but more truthful for large rolls that introduce other effects.

Finally, the third module 1026 is responsible for generation of the path of the stabilizing fin.

In general, the peculiarity of stabilization at anchor via stabilizing fins lies in the fact that it is not possible to impress a continuous stabilizing torque on the watercraft, as instead occurs during navigation. In fact, the limited movement of the blade entails a cycle of acceleration-deceleration that must lie within rigid limits of angle, such as for example [−40°,+40°], and, consequently, within given time limits.

For this reason, in various embodiments, the module 1026 evaluates at what velocity the fin is to be moved to obtain a stabilizing effect so as not to be forced to brake the fin when the stabilizing contribution were negative; i.e., the module 1026 chooses progressively the most appropriate type of path.

In one embodiment, to choose which path to follow, the module 1026 evaluates two scores, obtained from different cost functions.

In various embodiments, the module 1026 executes numerically simulations of the path of the fin (by varying the acceleration time, maximum velocity, amplitude of the fin stroke, deceleration time) and calculates the stabilizing-torque profile.

For instance, in one embodiment, the module basically calculates the same equations as the module 1024, i.e., Eqs. (9) to (12). However, while the module 1024 works instant by instant to estimate the actual values of roll of the watercraft and of the torque of actuation of the fin, the module 1026 makes a prediction according to a hypothetical path of the fin.

Figure 5:
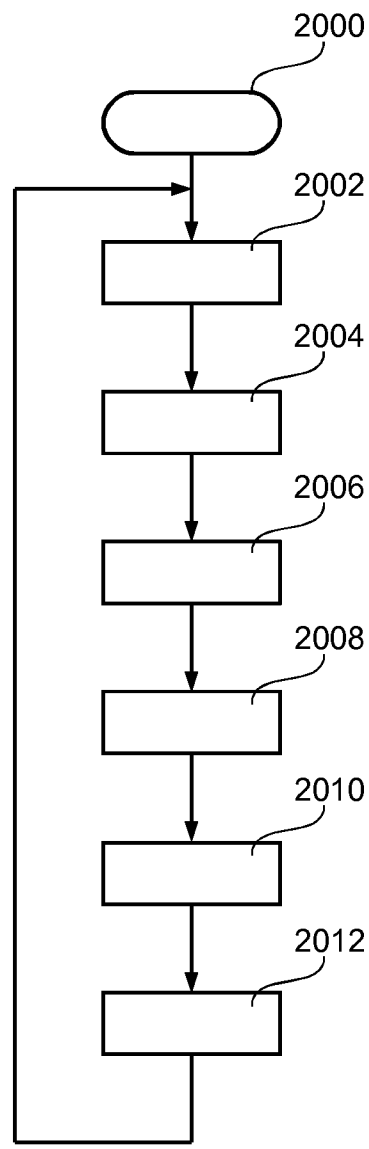
FIGS. 5 and 6A to 6I illustrate some details of an anti-roll stabilization system according to the present description.

FIG. 5 is a flowchart that illustrates operation of an embodiment of the module 1026, and FIGS. 6a to 6h illustrate some details of the steps executed by the module 1026.

In particular, after an initial step 2000, the module 1026 determines in a step 2002 the expected or predicted roll 300. For instance, in the embodiment considered, the module 1026 determines the hypothetical path for the duration of a period T or preferably of a half-period T/2, and consequently also the behaviour of roll is predicted for the same duration. For instance, in the embodiment considered, the duration of the path corresponds to T/2, and the roll is predicted and the path is determined at each maximum or minimum of the oscillation of roll, i.e., in the instants in which the velocity of roll is zero.

Figure 6A:
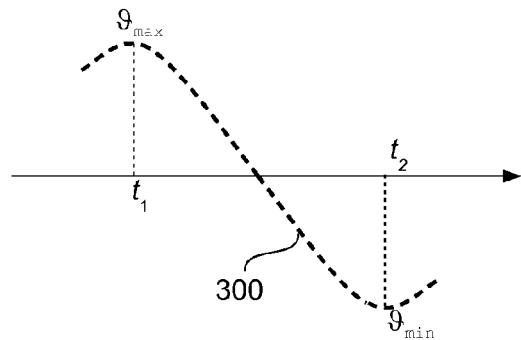

FIG. 6a shows in this context the half-period of a typical oscillation of predicted roll that starts at an instant $t_1$ from a position of maximum roll $\vartheta_{max}$ and ends at an instant $t_2$ to a position of minimum roll $\vartheta_{min}$.

For instance, in the embodiment considered and purely for purposes of illustration, the module calculates in step 2002 only the first method of the module 1024, namely, Eqs. (9) or (10).

For instance, in the embodiment considered, the module 1026 chooses a hypothetical path and calculates $$L = (c_v \cdot (\dot{\alpha} + c_c \cdot \dot{\vartheta}_{exp} \cdot \cos \alpha) + c_m \cdot \ddot{\alpha}) \cdot \cos \alpha$$

where $\dot{\vartheta}_{exp}$ is the expected velocity of roll of the watercraft. Said velocity of roll $\dot{\vartheta}_{exp}$ is typically not known. However, as described with reference to the module 1024, this datum can be estimated with a probabilistic approach. For instance, the module 1026 can also re-use the value determined via the module 1024.

In a step 2004, the module 1026 selects at least one initial path 302.

For instance, in one embodiment, it is possible to use two initial paths. The first initial path (see, for example, FIG. 6b) is based upon a basic path, in which the starting instant is pre-set, and in which the following are used:

a maximum amplitude from the current position to the extreme position in the opposite direction, such as for example +40° or −40°;

a certain percentage of the maximum velocity, such as for example 70% of the maximum velocity; and a certain percentage of the maximum acceleration, such as for example 70% of the maximum acceleration.

Instead, the second path (see, for example, FIG. 6c) is based upon a path specular to the one followed at the last fin stroke.

In a step 2006, the module 1026 chooses (and stores) the initial path with the better score of the two.

For instance, in one embodiment the module 1026 calculates for each path two scores $C_{F1}$ and $C_{F2}$ obtained from at least two different cost functions F1 and F2, such as for example:

a first cost function F1 based upon a least-squares difference between the of stabilizing-torque and destabilizing-torque profiles calculated by the module 1024; and a second cost function F2 that rewards the path of the fin with higher energy value.

In various embodiments, the module 1026 could use, for example as second cost function F2, a function that maximizes the product of the stabilizing-torque profiles (simulated from the path) and the profile of expected velocity of roll calculated by the module 1024.

Figure 6B:
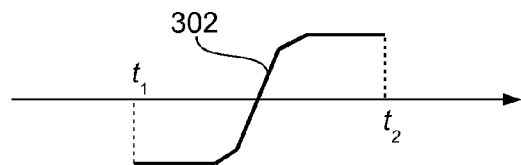
Figure 6C:
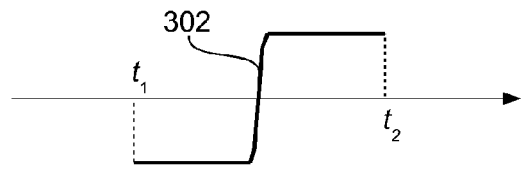

For instance, considering the prediction of roll and the initial paths represented in FIGS. 6a to 6c, the following costs could be obtained:

a cost of 153 for the calculation of the cost function F1 for the first initial path;

a cost of 121 for the calculation of the cost function F2 for the first initial path;

a cost of 122 for the calculation of the cost function F1 for the second initial path; and a cost of 125 for the calculation of the cost function F2 for the second initial path.

The inventors have found that the first cost function F1 achieves optimal results in the case of a sea that is fairly smooth, and the module 1026 manages to stabilize even rolls of extremely low degree (for example, 0.8° of roll are typically reduced to 0.2°).

Instead, in the case where the roll increases in amplitude, the module 1026 should weight more the second cost function F2 that rewards the path of the fin with higher energy value. In fact, it is not always possible to eliminate the roll entirely as occurs in sea that is fairly smooth. Consequently, in these conditions, the module 1026 can attempt to subtract from the system the higher energy using the angle and time "window" available for each fin stroke.

For this reason, in the embodiment considered, the module 1026 determines, in a step 2008, a value of total cost for each initial path via a combination of the respective cost values, in which at least one of the respective cost values is weighted as a function of the expected amplitude of roll $A_{exp}$.

In various embodiments, the expected amplitude of roll $A_{exp}$ is determined as a function of the instantaneous amplitude of roll A and of the time derivative of the instantaneous amplitude of roll $\dot{A}$. For instance, said data are also calculated in the module 1020 and can be re-used (see, for example, Eqs. (2) to (7) and the corresponding description).

Figure 6D:
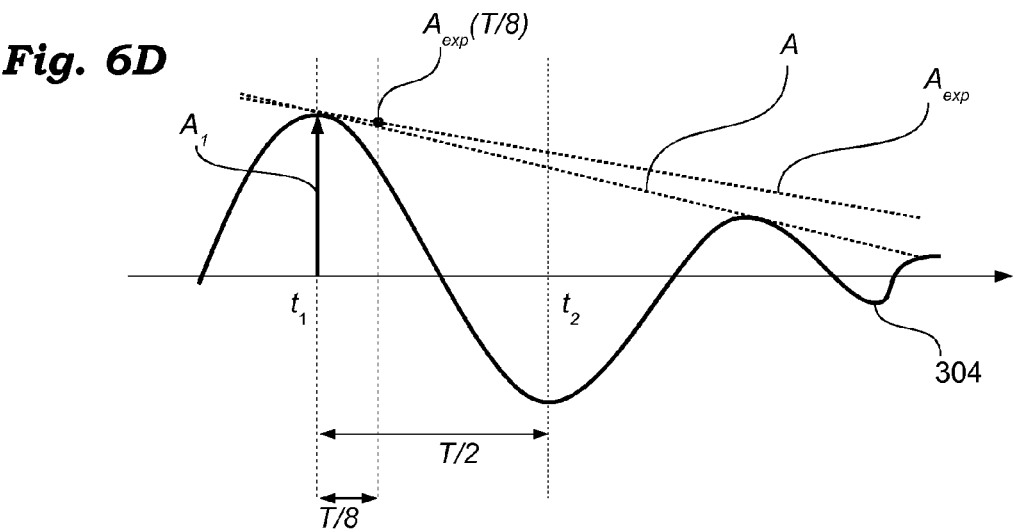

For instance, FIG. 6d shows an embodiment for calculating the expected amplitude of roll $A_{exp}$.

In particular, in FIG. 6d the line 304 indicates the actual roll of the watercraft.

At the instant $t_1$, the instantaneous amplitude of roll A has a first value $A_1$. As mentioned previously, said instantaneous amplitude of roll A can be calculated at each instant, but not as prediction. Hence, generally, the plot of the instantaneous amplitude of roll A is not known at the instant $t_1$.

However, knowing the time derivative of the instantaneous amplitude of roll $\dot{A}$, the plot of the amplitude of roll A can be estimated.

For instance in one embodiment, the following equation for estimating the expected amplitude of roll $A_{exp}$ is used:

$$A_{exp} = A + \dot{A} \cdot t$$

i.e., in the embodiment considered, for $A_{exp}$ the estimate of the slope of the instantaneous amplitude of roll $\dot{A}$ is used as slope. For instance, in one embodiment, the filtered estimate of $\dot{A}$ is used.

In one embodiment, the expected amplitude of roll $A_{exp}$ at one half of the half-period is used as reference value for weighting the cost values $$A_{exp}(T/4)=A+\dot{A}\cdot T/4$$

In fact, at one half of the half-period typically the maximum effectiveness of the fin stroke is obtained (to a first approximation).

In one embodiment, the total cost $C_C$ is calculated via the following equation $$C_c = b \cdot C_{F2} + (1-b) \cdot C_{F1} \quad (11)$$

where b is a coefficient determined as a function of the expected amplitude of roll $A_{exp}$.

Figure 6E:
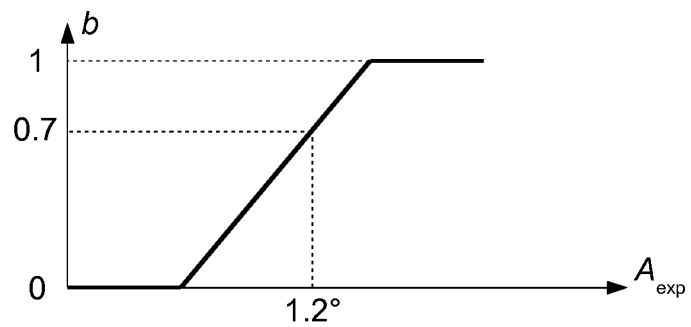

For instance, FIG. 6e shows an example of the relation between the coefficient b and the expected amplitude of roll $A_{exp}$, such as, for example, the amplitude of roll at one half of the half-period $A_{exp}(T/4)$. In particular, in the example considered, the coefficient b remains for small amplitudes of roll $A_{exp}$ substantially zero and increases from a certain point on linearly; i.e., for large rolls the second cost function F2 is more weighted.

For instance, considering an amplitude of oscillation $A_{exp}=1.2°$, the coefficient b could be 0.7. Consequently, by combining the respective cost values, we could obtain:

a total cost of 130.6 for the first initial path; and a total cost of 124.1 for the second initial path.

Consequently, for the example considered, the module would choose the second initial path, i.e., the path with the lower cost.

Once the better initial path has been selected, the module 1026 can adapt the parameters of the path chosen, in step 2008.

For instance, in one embodiment, the module 1026 can lower or raise the values of velocity and acceleration and if necessary reduce also the amplitude of the fin stroke.

Figure 6F:
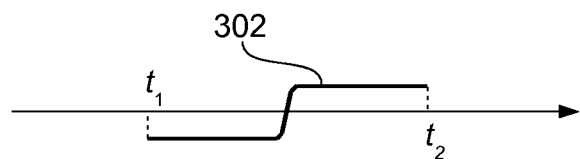
Figure 6G:
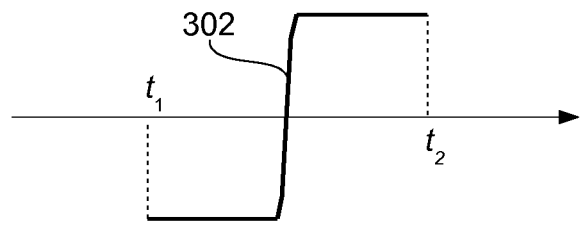

For instance, FIGS. 6f and 6g illustrate the profile of the second path (see FIG. 6c), where the amplitude has been reduced (FIG. 6f) or increased (FIG. 6g).

For instance, in one embodiment the module 1026 varies the above parameters of the path until:

a) there is no new better solution by varying the parameters; or b) the computing time has expired because the starting instant has arrived.

For instance, to evaluate the modified path, the module 1026 can calculate the respective total cost.

In a step 2010, the module 1026 yields instant by instant the position, velocity, and acceleration of the fin. Said values can be supplied as input to the (adaptive) control module of the actuator 106 illustrated with reference to FIG. 2 or FIG. 3.

Finally, the module 1026 returns to step 2002 for determining the next path.

In one embodiment, before recommitting the next path, the module 1026 checks, in an optional step 2012, the behaviour of the watercraft in response to the movement of the stabilizing fin and, in the case where there is an excess of compensation, interrupts the movement of the fin.

Figure 6H:
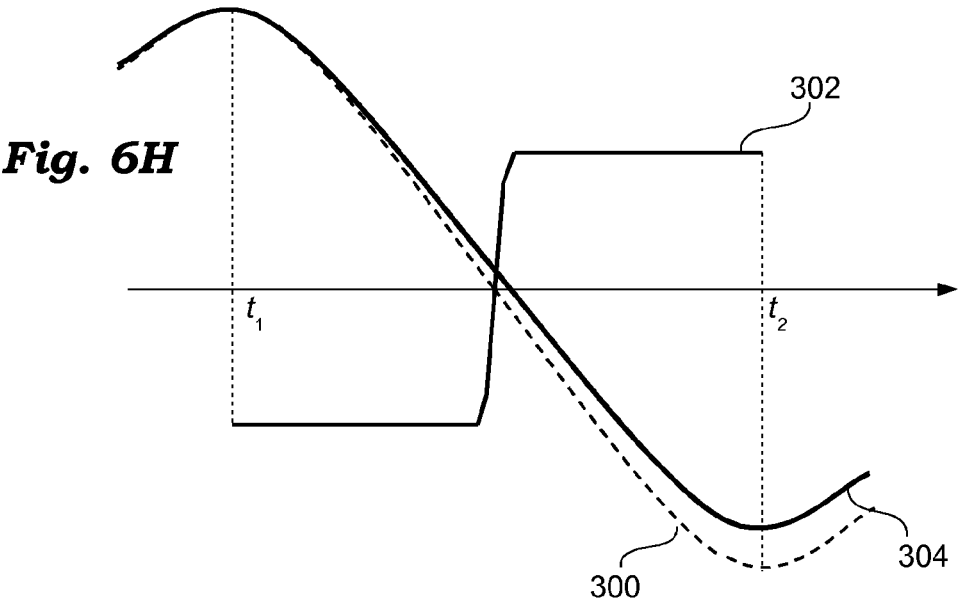

For instance, FIG. 6h shows an example without interruption of the fin stroke.

In particular, in the example considered the line 300 indicates the expected roll and the line 302 indicates the path chosen in step 2010. In particular, as described previously, the behaviour of said lines is determined at the maxima and minima of the oscillation of roll, for example, at the instants $t_1$ and $t_2$. Instead, the line 304 indicates the actual roll of the watercraft.

Figure 6I:
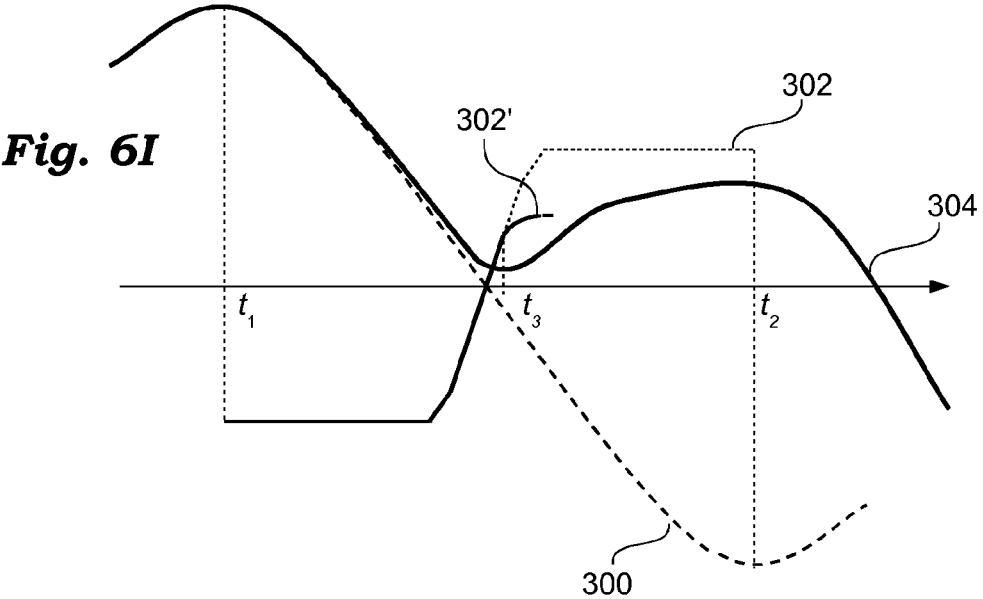

Instead, FIG. 6i shows an example in which the fin stroke is interrupted on account excess of compensation.

Also in this case, the lines 300, 302 and 304 indicate, respectively, the expected roll, the chosen path, and actual roll of the watercraft. However, in this case, the fin stroke is interrupted because the prediction of roll is not realistic. For instance, said condition can be determined easily because the duration of the half-period of the actual oscillation, i.e., the duration between the instant $t_1$ and the instant $t_3$, is substantially shorter than the duration T/2 expected.

For instance, in this case, the module 1026 can brake (more or less sharply) the stabilizing fin and interrupt the path that it is following.

In particular, an over-compensation typically occurs because the watercraft has not reduced its roll (correct compensation) or stopped its roll (perfect compensation), but has started to roll in the opposite direction (over-compensation).

The inventors have noted that this behaviour is identified by a local minimum of roll that occurs long before it would be normal for it to occur. For instance, typically it is not normal for a local minimum of this sort to occur before a time equal, for example, to 80% of the half-period.

For instance, in one embodiment said local minimum of roll can be determined by detecting a reversal of the velocity of roll.

For instance, in the example illustrated in FIG. 6i, a minimum of roll is detected at the instant $t_3$. Next, the module 1026 can compare the time elapsing between the instants $t_1$ and $t_3$ with the duration of the period T or half-period T/2 and decide whether said minimum is caused by an over-compensation. In particular, at the instant $t_3$, since the movement of the fin is no longer necessary or even very deleterious for the purposes of stabilization, the movement can be interrupted more or less sharply, for example, as a function of the velocity of roll measured instantaneously, i.e., the velocity of roll in a direction opposite to the "normal" one if there had not been over-compensation. For instance, a possible movement of the stabilizing fin with respect to the expected movement 302 is represented by the line 302'.

In one embodiment, instead of waiting for the next half-period, the module 1026 recalculates immediately the expected roll and seeks the new optimal path; i.e., it returns to step 2002.

The person skilled in the branch will appreciate that the solutions outlined in the present description could be improved in the case where there are available direct measurements of the destabilizing component acting on the watercraft. For instance, this would be deducible using pressure sensors on the hull so as to have a mapping of the forces acting on the watercraft itself, and/or laser sensors, radar sensors, ultrasound sensors, or other sensors, for measuring the position of the surface of the sea and reconstructing the mapping of the surface of the sea around the watercraft and the translation/velocity of the waves with respect to the watercraft, which would enable anticipation of the oscillations of the watercraft.

Moreover, the solutions described previously may be integrated also with the direction of the wind, which provides a first estimate of the direction from which the waves arrive, even though there exist situations in which the waves have a direction different from that of the wind; these, however, are minority situations.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A method for controlling a stabilizing fin for anti-roll stabilization of watercraft standing at anchor via an electrical actuator comprising an electric motor and a reducer, comprising the steps of:
   detecting at least one value identifying roll of said watercraft while said watercraft standing at anchor;
   estimating an expected oscillation of roll of said watercraft as a function of said at least one value detected, thereby determining an amplitude of oscillation and period of oscillation;
   determining an expected profile of a destabilizing moment of the sea by taking into account a stabilizing moment of the stabilizing fin, wherein the stabilizing moment is calculated as a function of an instantaneous stabilizing torque generated by the stabilizing fin, wherein the instantaneous stabilizing torque is calculated as a function of a reduction ratio between the movement of the motor and the stabilizing fin, a motor torque, an acceleration of the motor, a moment of inertia of the motor, a moment of inertia of the reducer, and an efficiency of the electrical actuator;
   predicting a path for movement of said stabilizing fin by selecting an initial path of a fin stroke; and
      executing numerical simulations of the path of the stabilizing fin by varying acceleration time, maximum velocity, amplitude and deceleration time of the fin stroke; and
      calculating a stabilizing-torque profile; and
   controlling instant by instant movement of said stabilizing fin as a function of said predicted path, wherein said expected oscillation of roll is estimated and said path is predicted in the instants in which velocity of roll is zero, and wherein said path is predicted for a duration of half said determined period or said determined period,
   wherein said determination of a path for the movement of said stabilizing fin as a function of said expected oscillation of roll comprises:
      selecting at least two initial paths; and
   selecting one of said at least two initial paths according to a cost function,
   wherein said at least two initial paths are chosen between:
      a first initial path, wherein a maximum amplitude from a current position to an extreme position in an opposite direction, a certain percentage of the maximum velocity of the movement, and a certain percentage of a maximum acceleration of said stabilizing fin are used; and
      a second path specular to the one followed at a previous fin stroke.

2. The method according to claim 1, wherein said estimation of the expected oscillation of roll of said watercraft as a function of said at least one detected value comprises modelling the oscillation of roll of said watercraft via a sinusoidal wave.

3. The method according to claim 1, further comprising: estimating a stabilizing moment of the fin.

4. The method according to claim 1, wherein said destabilizing moment of the sea is estimated via calculating how the destabilizing moment varies on average.

5. The method according to claim 3, wherein the stabilizing moment of the fin is determined as a function of a stabilizing torque generated by the fin.

6. The method according to claim 1, wherein said selection of one of said at least two initial paths according to a cost function comprises calculating at least one of the following cost functions:
   a cost function based upon a least-squares difference between a stabilizing-torque and destabilizing-torque profiles;
   a cost function that rewards the path of the fin with higher energy value; and
   a function that maximizes the product of the stabilizing-torque profiles and the profile of expected velocity of roll.

7. A control system for anti-roll stabilization of watercraft standing at anchor, comprising:
   a stabilizing fin; and
   a controller configured for implementing the method according to claim 1.

8. A computer-readable storage medium storing instructions, which, when executed on a computer perform an operation according to claim 1.

9. The method according to claim 1, wherein numerical simulations of the paths of the stabilizing fin is executed by a controller upon detecting at least one value identifying roll of said watercraft.

10. The method of according to claim 1, wherein determining a path for movement of said stabilizing fin as a function of said expected oscillation of roll by executing numerical simulations of possible paths of the stabilizing fin and calculating corresponding stabilizing-torque profiles.

11. The method of claim 1, further comprising monitoring the instants in which the velocity of roll is zero.

12. The method of claim 1, wherein the instantaneous stabilizing torque is calculated as a linear combination of the motor torque, a moment of inertia of the motor, a moment of inertia of the reducer, and an efficiency of the electrical actuator.

13. A method for controlling a stabilizing fin for anti-roll stabilization of watercraft standing at anchor via an hydraulic actuator comprising a hydraulic cylinder, comprising the steps of:
   detecting at least one value identifying roll of said watercraft while said watercraft standing at anchor;
   estimating an expected oscillation of roll of said watercraft as a function of said at least one value detected, thereby determining an amplitude of oscillation and period of oscillation;
   determining an expected profile of a destabilizing moment of the sea by calculating a stabilizing moment of the stabilizing fin, wherein the stabilizing moment is calculated as a function of an instantaneous stabilizing torque generated by the stabilizing fin, wherein the instantaneous stabilizing torque is calculated as a function of an arm of the hydraulic cylinder, a contribution of a useful arm of the hydraulic cylinder as the angle of the fin varies, and an equivalent area of the hydraulic cylinder;
   predicting a path for movement of said stabilizing fin by selecting an initial path of a fin stroke; and
      executing numerical simulations of the path of the stabilizing fin by varying acceleration time, maximum velocity, amplitude and deceleration time of the fin stroke; and
      calculating a stabilizing-torque profile; and controlling instant by instant movement of said stabilizing fin as a function of said predicted path, wherein said expected oscillation of roll is estimated and said path is predicted in the instants in which velocity of roll is zero, and wherein said path is predicted for a duration of half said determined period or said determined period, wherein said determination of a path for the movement of said stabilizing fin as a function of said expected oscillation of roll comprises:

selecting at least two initial paths; and selecting one of said at least two initial paths according to a cost function, wherein said at least two initial paths are chosen between:

a first initial path, wherein a maximum amplitude from a current position to an extreme position in an opposite direction, a certain percentage of the maximum velocity of the movement, and a certain percentage of a maximum acceleration of said stabilizing fin are used; and a second path specular to the one followed at a previous fin stroke.

14. The method according to claim 13, wherein said estimation of the expected oscillation of roll of said watercraft as a function of said at least one detected value comprises modelling the oscillation of roll of said watercraft via a sinusoidal wave.

15. The method according to claim 13, further comprising:

estimating a stabilizing moment of the fin.

16. The method according to claim 13, wherein said destabilizing moment of the sea is estimated via calculating how the destabilizing moment varies on average.

17. The method according to claim 13, wherein the instantaneous stabilizing torque is calculated as a product of the arm of the hydraulic cylinder, the contribution of the useful arm of the hydraulic cylinder as the angle of the fin varies, and the equivalent area of the hydraulic cylinder.

* * * * *